(12) United States Patent
Morawietz et al.

(10) Patent No.: US 11,230,446 B2
(45) Date of Patent: Jan. 25, 2022

(54) CONTAINER STACKING STORAGE SYSTEM LOADING TROLLEY

(71) Applicant: Jungheinrich Aktiengesellschaft, Hamburg (DE)

(72) Inventors: Timm Morawietz, Tholey-Überroth (DE); Jörg Cavelius, Bad Vilbel (DE); Michael Becker, Hainburg (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 0 days.

(21) Appl. No.: 16/998,602

(22) Filed: Aug. 20, 2020

(65) Prior Publication Data
US 2021/0053778 A1    Feb. 25, 2021

(30) Foreign Application Priority Data

Aug. 23, 2019    (EP) .................................... 19193382

(51) Int. Cl.
*B65G 57/30*    (2006.01)
*B65G 59/06*    (2006.01)

(52) U.S. Cl.
CPC ......... *B65G 57/303* (2013.01); *B65G 59/063* (2013.01)

(58) Field of Classification Search
CPC .. B65G 57/303; B65G 59/063; B65G 57/302; B65G 1/0471; B66F 9/063
See application file for complete search history.

(56) References Cited

U.S. PATENT DOCUMENTS

| 4,832,170 A * | 5/1989 | Takeuchi ............. B23Q 7/1431 198/346.1 |
| 8,851,488 B2 * | 10/2014 | Carruyo ............. B62D 25/2054 280/79.11 |
| 10,289,117 B1 | 5/2019 | Zou et al. |
| 2003/0184071 A1 | 10/2003 | Tokumaru |

FOREIGN PATENT DOCUMENTS

| CN | 108128587 A | 6/2018 |
| CN | 109573443 A | 4/2019 |
| DE | 19855927 A1 | 6/2000 |
| DE | 198 49 391 C2 | 2/2002 |
| EP | 2404847 A1 | 1/2012 |
| WO | WO2017091596 A1 | 6/2017 |

OTHER PUBLICATIONS

EP Search Report from Application No. 19193382.9-1017, dated Feb. 12, 2020.

* cited by examiner

*Primary Examiner* — Lynn E Schwenning
(74) *Attorney, Agent, or Firm* — Greenblum & Bernstein, P.L.C.

(57) ABSTRACT

A container stacking storage system loading trolley that includes a chassis and a height-adjustable container seat that includes a receiving region with a container contact surface, wherein a lifting device that operates in a lifting direction is arranged between the chassis and the container seat. The container stacking storage system operates in an economical manner, whereby a bearing arrangement is arranged between the container seat and the chassis, which bearing arrangement enables a movement of the container seat transversely to the lifting direction relative to the chassis.

9 Claims, 2 Drawing Sheets

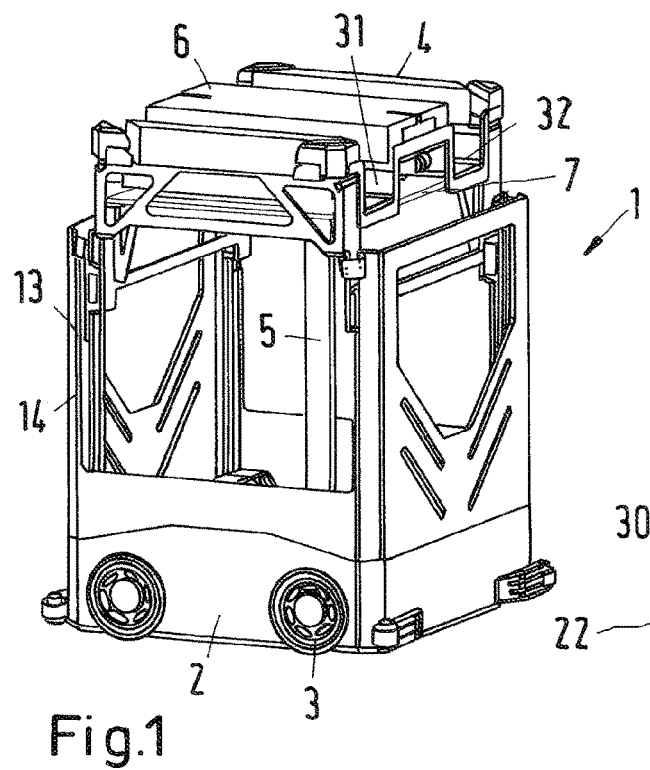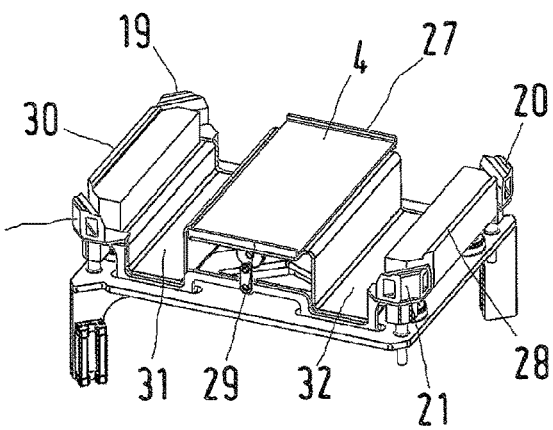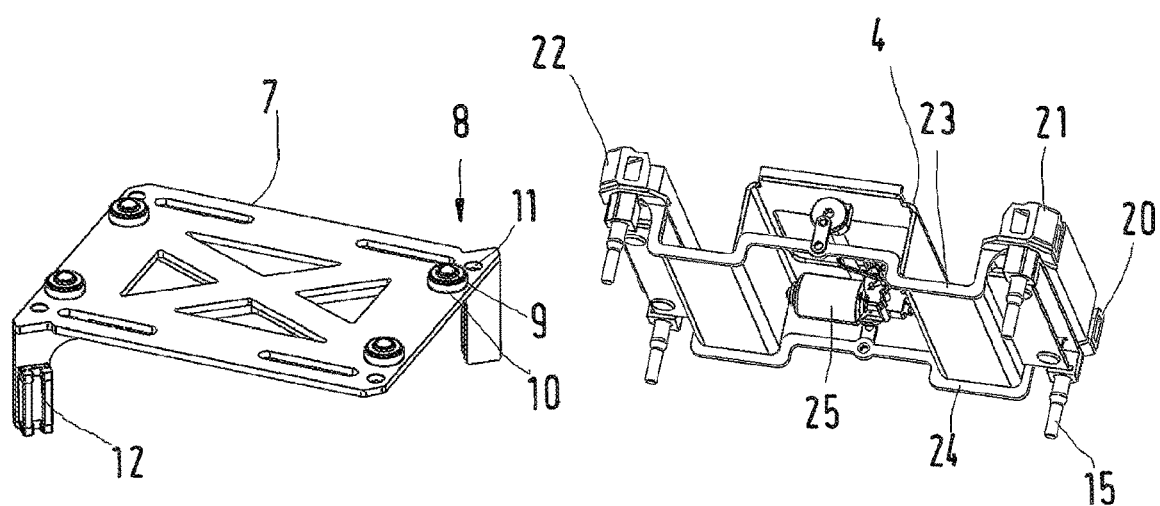

CONTAINER STACKING STORAGE SYSTEM LOADING TROLLEY

CROSS-REFERENCE TO RELATED APPLICATIONS

The present application claims priority under 35 U.S.C. § 119 of European Patent Application No. EP 19193382.9, filed Aug. 23, 2019, the disclosure of which is expressly incorporated by reference herein in its entirety.

BACKGROUND

1. Field of the Invention

The present invention relates to a container stacking storage system loading trolley having a chassis and a container seat that is height-adjustable relative to the chassis, which container seat comprises a receiving region with a container contact surface, wherein a lifting device that operates in a lifting direction is arranged between the chassis and the container seat.

2. Discussion of Background Information

A loading trolley of the aforementioned type is known from DE 198 49 391 C2, for example.

A container stacking storage system is a storage system in which a plurality of containers can be stored with a relatively good utilization of the available space because the containers are arranged in stacks. If the containers are to be introduced into a stack from below and are also to be removed from the stack again from below, then there is a loading space below the stacks of containers, into which loading space the loading trolley can be driven. The bottommost container of a stack is thereby held by a releasable holding mechanism. To introduce a container, the loading trolley is driven under the stack. It then lifts the container until it contacts, up to this point, the bottommost container of the stack. In a further lifting of the container, the entire stack is lifted. The lifting takes place until the container being newly introduced has been guided past the aforementioned holding mechanism and, in a subsequent lowering movement, is held by the holding mechanism. If the container is to be removed from the stack, the entire stack must then be lifted slightly so that the holding mechanism can be released and briefly kept open. The stack as a whole is subsequently lowered, and the holding mechanism then engages on the container that was second from the bottom up to this point, in order to hold this container. Once the container that was second from the bottom up to this point is hindered from a further downward movement by the holding mechanism, the container being removed can be further lowered. The loading trolley can then transport the container out of the container stacking storage system.

During the placement of a container into storage, and also during the removal of a container, the loading trolley must be positioned relatively accurately under the relevant stack. During the placement into storage, the container being placed into storage must engage with the bottommost container of the stack. During the removal of the container, the container must be able to be placed reliably on the container contact surface. The greater the requirement for the positioning accuracy of the loading trolley is, the more time the loading trolley needs to reach the desired position, and the higher the costs are for the accompanying control.

SUMMARY

Embodiments of the invention provide for the placement of containers into storage and the removal of containers from a container stacking storage system to be economical.

This is achieved, according to the invention, with a container stacking storage system loading trolley of the type described above, in that a bearing device, or bearer, is arranged between the container seat and the chassis, which bearing device enables a movement of the container seat transversely to the lifting direction relative to the chassis.

With an embodiment of this type, the requirement for the positioning accuracy of the loading trolley in relation to the stack into which a container is to be placed into storage or out of which a container is to be removed is reduced or rendered small. The loading trolley can be positioned below the stack with a greater tolerance. If the container is lifted during the placement into storage, it can move laterally slightly when it contacts the bottommost container of the stack because the container seat permits a lateral movement of this type. The same applies for the removal of a container from the stack. When the container seat contacts the bottommost container of a stack with the container contact surface, the container seat can be laterally displaced slightly relative to the chassis in order to be able to receive the container.

Preferably, a fixing device, or "fixer", is provided which fixes the container seat transversely to the lifting direction relative to the chassis, wherein the fixing device is releasable. A lateral movement of the container seat is not desired in all operating states of the loading trolley. For example, it is desirable to be able to fix the container seat relative to the chassis when the container is transported out of the container stacking storage system. The fixing device is used for this purpose. However, the fixing device is releasable so that, in the placement-into-storage operation described above and the removal-from-storage operation described above, it is possible to ensure that the container seat is mounted in a floating manner relative to the chassis.

Preferably, the fixing device comprises a pin arrangement, or a plurality of pins, comprising at least one pin running parallel to the lifting direction, which pin is arranged in a bore that is arranged in a stationary manner transverse to the lifting direction, wherein the pin comprises a first section with a first diameter that is smaller than a diameter of the bore and a second section with a second diameter that corresponds to the diameter of the bore, wherein between the first section and the second section a transition section is provided in which the diameter of the pin increases from the first diameter to the second diameter. If the pin has been moved relative to the bore such that the first section is located in the bore, then the pin can be moved in the bore. The pin is attached to the container seat so that, in this state, the container seat can move relative to the bore arranged in a stationary manner transverse to the lifting direction. If the container seat is then moved with the pin such that the second section of the pin is located in the bore, then a movement of this type is no longer possible. The second diameter is slightly smaller than the diameter of the bore, in order to prevent a jamming of the pin relative to the bore. A small amount of play is acceptable. The transition region causes the pin to be centered in the bore when the second section of the pin is moved into the bore.

Preferably, the lifting device comprises a first lifting drive, and a second lifting drive is provided which acts on an unlocking device, or unlocker, for holding elements of a container stacking storage system, wherein the second lifting drive forms a part of the fixing device. If a container is removed from a stack, then the holding elements of the container stacking storage system must be released and kept open until the container being removed has been guided past the holding elements. This can also be accomplished in that the unlocking device is moved with the aid of the second lifting drive after the movement of the container seat to the bottommost container, and therefore the container being removed, of the stack. The unlocking device is then, for example, moved upwards in order to keep the holding elements open, and if necessary also to release the holding elements, if the releasing does not take place through the container itself. In this situation, however, it is beneficial if the container seat can be moved transversely to the lifting direction of the first lifting device in order that it can be placed in the desired position on the container. Accordingly, the second lifting drive can be used to release the fixing device, for example in that it lifts the pin(s) so that the first, smaller diameter of the pin is arranged in the bore.

Here, it is preferred that the unlocking element arrangement comprises multiple unlocking elements arranged in the region of corners of the container seat, wherein at least some of the unlocking elements comprise a centering surface arrangement, or centerer, that is directed towards the receiving region. The unlocking elements thus have an additional function. They serve to position the container seat relative to the container.

Here, it is preferred that the unlocking element arrangement is in operative connection with the pin arrangement. Thus, if the unlocking element arrangement is lifted, then the pin arrangement is likewise lifted in order to release the fixing of the container seat transversely to the lifting direction relative to the chassis.

Preferably, the centering surface arrangement is sloped relative to the lifting direction. This facilitates the "threading-in" of the container on the container contact surface. The centering surface arrangement then forms a type of "funnel" into which the base of the container being removed can enter. The container seat moves transversely to the lifting direction into the correct position under the effect of the centering surface arrangement.

Preferably, the unlocking element arrangement protrudes past the container contact surface in the receiving region in a transport position of the container seat. The container is thus held securely during transport. The protrusion thereby need not be overly large, however.

Alternatively or additionally, it can be provided that the container seat comprises edge bars that bound the container contact surface. The edge bars can also be used to prevent the container from sliding off of the container contact surface.

Preferably, the container seat is mounted on a base plate with which the lifting device interacts. The lifting function can then be decoupled from the floating support. The lifting device acts only on the base plate. The floating support of the container seat occurs between the container seat and the base plate.

Preferably, a ball roller arrangement is arranged between the base plate and the container seat. The ball roller arrangement can, for example, comprise one or more balls that are held on the base plate but can rotate. The container seat then rests on the ball so that the ball(s) are rotated during a movement of the container seat transverse to the lifting direction.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 1 shows a loading trolley for a container stacking storage system in a perspective illustration, FIG. 2 shows a perspective illustration of a container seat with a base plate, FIG. 3 shows the base plate, FIG. 4 shows the container seat in a perspective illustration from below.

DETAILED DESCRIPTION

Figure 5:
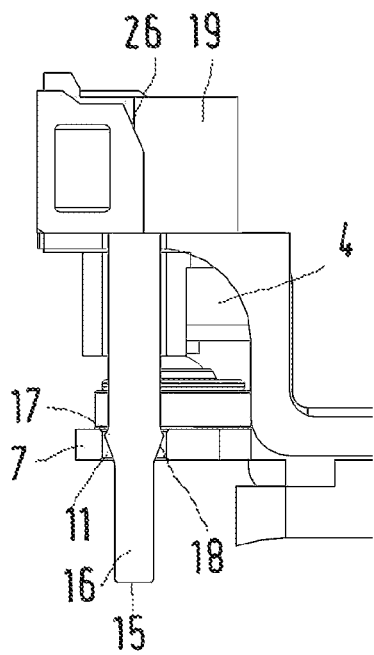
FIG. 5 shows a fixing device in a fixing position.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 schematically shows a loading trolley 1 for a container stacking storage system that is not illustrated in greater detail.

The loading trolley 1 comprises a chassis 2 having multiple wheels 3 with which the loading trolley can be moved on a flooring or another surface.

The loading trolley 1 furthermore comprises a height-adjustable container seat 4, the height of which can be changed relative to the chassis 2 by a lifting device 5, of "lifter." The lifting device 5 comprises a traction chain with which the container seat 4 can be moved in a lifting direction. The lifting direction thereby normally corresponds to the direction of gravity.

The container seat 4 comprises a container contact surface 6 on which a container that is not illustrated in greater detail can be placed. The traction chain is driven by an electric motor or another actuator that can be hydraulically or pneumatically embodied. The traction chain thus forms a part of a lifting drive.

The container seat 4 is arranged on a base plate 7 which is illustrated in greater detail in FIG. 3. The base plate 7 comprises multiple ball roller arrangements 8, or rollers. Each ball roller arrangement 8 comprises a ball 9 that is held in a cage 10 which is attached to the base plate 7.

Next to each ball roller arrangement 8, a bore 11 is arranged which forms a part of a fixing device that is described further below.

The base plate 7 comprises guide elements 12 with which it is guided in corresponding guides 13 that are attached to the chassis 2. The guides 13 are thereby arranged on braces 14 that run vertically.

FIG. 1 shows an embodiment in which corresponding guides 12 are provided on all four corners of the base plate 7. FIGS. 2 and 3 show a modified embodiment in order to demonstrate that, in principle, only two guides 12 that are preferably arranged at diagonally opposing corners of the base plate 7 are necessary.

The container seat 4 rests on the ball roller arrangements 8. The ball roller arrangements 8 thereby form a bearing device or arrangement that enables a movement of the container seat 4 transversely to the lifting direction relative to the chassis 2.

A movement of this type can, however, be blocked by the fixing device already mentioned above. Therefore, the fixing device can be regarded as a "movement blocker." The fixing device is releasable in order to enable the movement of the container seat 4 relative to the base plate 7, and thus relative to the chassis 2. For this purpose, the fixing device comprises a pin arrangement having at least one pin 15. In the present exemplary embodiment, however, corresponding pins 15 are provided at all corners of the container seat 4. Each pin 15 enters into the aforementioned bore 11.

As can be seen in FIG. 5, each pin 15 comprises a first section 16 with a first diameter that is smaller than a diameter of the bore 11, for example 10 mm to 30 mm smaller. Each pin 15 furthermore comprises a second section 17 that has a second diameter that corresponds to the diameter of the bore 11. The second section 17 exhibits a small amount of play relative to the bore 11, that is, the second diameter is slightly smaller than the diameter of the bore 11. The play is, however, only large enough that a movement of the pin 15 in the bore 11 is enabled. Between the first section 16 and the second section 17, a transition region 18 is provided in which the diameter of the pin 15 expands from the first diameter towards the second diameter.

The container seat 4 comprises an unlocking device that comprises one unlocking element 19-22 each at the four corners of the container seat. The unlocking elements 19-22 are attached to a frame arrangement having two frames 23, 24. The frames 23, 24 are connected to a second lifting drive 25 with which the frames 23, 24, and therefore the unlocking elements 19-22, can be lifted and lowered relative to the container seat 4, and therefore relative to the base plate 7.

Figure 7:
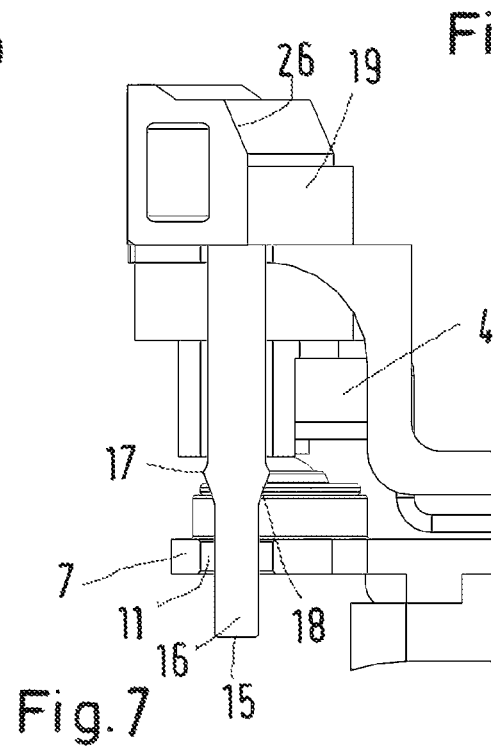
FIG. 7 shows the fixing device in a released position.

If the unlocking elements 19-22 are lifted, they can open and/or keep in an open position holding elements, which are not illustrated in greater detail, of a container stacking storage system until a container being removed has been lowered with the container seat 4. The pins 15 are connected to the frame 23 and are also lifted in tandem in a lifting of the unlocking elements 19-22. In this manner, the pins 15 move from the position illustrated in FIG. 5, in which the container seat 4 is fixed transversely to the lifting direction relative to the base plate 7, into the position illustrated in FIG. 7, in which the container seat 4 is mounted in a floating manner relative to the base plate 7.

In this position, a movement of the container seat 4 transversely to the lifting direction relative to the base plate 7 is possible, namely in the order of a few centimeters, for example, 1 to 3 cm.

The unlocking elements 19-22 comprise a centering surface arrangement. The centering surface arrangement comprises a surface 26 that is sloped relative to the lifting direction. If the container seat 4 is moved towards a container from below, for example, at a point for placement into or removal from storage, then the unlocking elements 19-22 have first been moved away from the base plate 7 and the unlocking elements 19-22 come into contact with the container with the sloped surface 26. It is thus possible to align the container seat 4 with the container.

As can be seen in FIG. 2, the container seat comprises at the edges thereof edge bars 27-30 which prevent a container resting on the container seat 4 from being able to slide off of the container seat 4 during transport out of the stacking storage system or into the stacking storage system.

Figure 6:
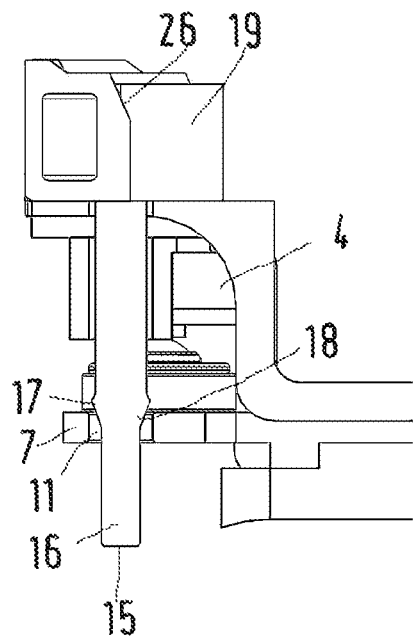
FIG. 6 shows the fixing device during release.

FIG. 6 shows the situation during the lowering of the unlocking elements 19-22. The pin 15 is centered in the bore 11 by the transition region 18 so that the container seat 4 once again has a defined position relative to the base plate 7.

The container seat 4 also comprises notches 31, 32, wherein the opening of the notches 31, 32 is preferably directed in the rolling direction of the wheels 3. It is thus possible to transfer a container that is resting on the container seat 4 to a delivery station, wherein it is merely necessary that the delivery station comprise two prong-like projections that can enter into the notches 31, 32 when the loading trolley 1 is moved thereto accordingly. The container seat 4 can then be lowered so that the container can be transferred to the delivery station. The receipt of a container from a corresponding receiving device can also be realized in this manner. For this purpose, the loading trolley 1 is driven into the receiving device without a container. If the lifting device 5 then lifts the container seat 4, the container comes free of the receiving device and can then be transported away together with the loading trolley 1.

The foregoing examples have been provided merely for the purpose of explanation and are in no way to be construed as limiting of the present invention. While the present invention has been described with reference to an exemplary embodiment, it is to be understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A container stacking storage system loading trolley comprising:
   a chassis;
   a container seat configured to be adjustable relative to the chassis, said container seat comprising a receiving region having a container contact surface;
   a lifter configured to operate in a lifting direction, said lifter being arranged between the chassis and the container seat;
   a fixer configured to fix the container seat transversely to the lifting direction relative to the chassis;
   the fixer being releasable and being configured to store the container seat in a floating manner, whereby the fixer is configured to be released when the container seat is lifted;
   a bearer arranged between the container seat and the chassis, said bearer being configured to enable a movement of the container seat transversely to the lifting direction relative to the chassis.

2. The loading trolley according to claim 1, wherein the lifter comprises a first lifting drive and a second lifting drive, the second lifting drive being configured to act on an unlocker for holding elements of a container stacking storage system, wherein the second lifting drive forms a part of the fixer.

3. The loading trolley according to claim 2, wherein the unlocker comprises multiple unlocking elements arranged in the region of corners of the container seat, wherein at least some of the unlocking elements comprises a centerer that is directed towards the receiving region.

4. The loading trolley according to claim 3, wherein the unlocker is in operative connection with the plurality of pins.

5. The loading trolley according to claim 3, wherein the centerer is sloped relative to the lifting direction.

6. The loading trolley according to claim 3, wherein the unlocker protrudes past the container contact surface in the receiving region in a transport position of the container seat.

7. The loading trolley according to claim 3, wherein the container seat comprises edge bars that bound the container contact surface.

8. A container stacking storage system loading trolley comprising:
- a chassis;
- a container seat configured to be adjustable relative to the chassis, said container seat comprising a receiving region having a container contact surface;
- a lifter configured to operate in a lifting direction, said lifter being arranged between the chassis and the container seat;
- a fixer configured to fix the container seat transversely to the lifting direction relative to the chassis, the fixer being releasable;
- a bearer arranged between the container seat and the chassis, said bearer configured to enable a movement of the container seat transversely to the lifting direction relative to the chassis;

the fixer comprising a plurality of pins comprising at least one pin running parallel to the lifting direction, said at least one pin being arranged in a bore that is stationary transversely to the lifting direction, wherein the at least one pin comprises a first section with a first diameter that is smaller than a diameter of the bore and a second section with a second diameter that corresponds to the diameter of the bore, wherein between the first section and the second section a transition section is provided in which the diameter of the at least one pin increases from the first diameter to the second diameter.

9. A container stacking storage system loading trolley comprising:
- a chassis;
- a container seat configured to be adjustable relative to the chassis, said container seat comprising a receiving region having a container contact surface, the container seat being mounted on a base plate and the lifter interacts with the base plate;
- a lifter configured to operate in a lifting direction, said lifter being arranged between the chassis and the container seat;
- a ball roller is arranged between the base plate and the container seat;
- a bearer arranged between the container seat and the chassis, said bearer configured to enable a movement of the container seat transversely to the lifting direction relative to the chassis.

\* \* \* \* \*